Nov. 28, 1950     C. C. REYNOLDS     2,532,119
CASE FOR FISHING REELS
Filed April 29, 1948
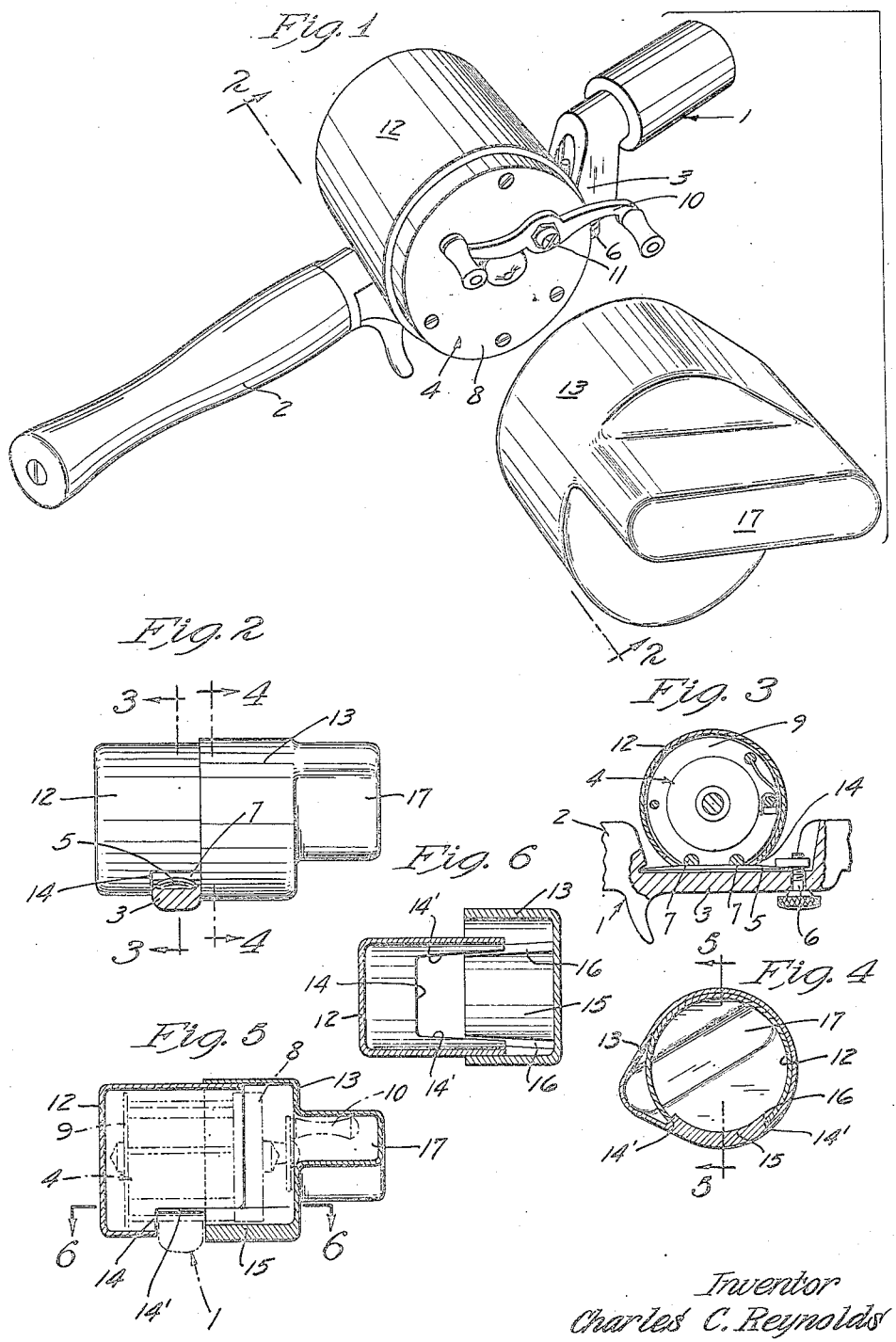
Inventor
Charles C. Reynolds
By his Attorneys
Merchant & Merchant Patented Nov. 28, 1950

2,532,119

UNITED STATES PATENT OFFICE 2,532,119

CASE FOR FISHING REELS

Charles C. Reynolds, Minneapolis, Minn., assignor to Reyson, Inc., Minneapolis, Minn., a corporation of Minnesota Application April 29, 1948, Serial No. 23,974

3 Claims. (Cl. 206—1)

My invention relates generally to cases for fish line reels and has for its primary object the provision of a case which may be used to enclose such a reel, whether the same is attached to or detached from a cooperating fish rod.

Casting reels are conventionally provided with a mounting base or flange which is secured to the bottom of the reel and projects tangentially in opposite directions therefrom. A reel case, constructed according to my invention, comprises a pair of tubular sections each closed at one end and each adapted to receive therein the opposite ends of a generally cylindrical reel and thereafter to be telescoped one upon the other. One of the said sections is provided with an outwardly-opening notch in its tubular wall for receiving the reel mount base or flange therein so that the opposite ends of the flange and the base thereof are free and hence may be attached to or detached from a cooperating fishing rod when the case is inserted over the reel.

A further object of my invention is the provision of novel means in the form of a wedge-shaped tongue carried by one of the tubular members, which tongue is adapted to be received within the notch of the other of said sections, whereby to retain the notched section against collapsing action and at the same time to frictionally hold the two tubular members together against accidental separation.

A still further object of my invention is the provision of a rigid case which will adequately protect the reel against damage, even under rough handling, whether said reel is attached to or detached from a fishing rod.

A further object of my invention is the provision of a reel case which will shield the reel from dirt and dust to a large degree, but which will at the same time allow circulation therethrough of some air so as to prevent rotting of a moist fish line wound on a reel contained therein.

Another object of my invention is the provision of a novel case for casting reels and the like which comprises a pair of tubular sections, both of which are generally cylindrical in cross section but one of which has a radially outwardly bulged portion for reception thereinto of the offset crank-acting handle which normally projects radially outwardly of the conventional reel.

A still further and no less important object of my invention is the provision of a case which may be inserted unto the reel at the place of manufacture, which will protect the same during storage and shipment, and which may be used throughout the life of the reel by the purchaser, and which case, when made of transparent materials such as transparent plastics, makes an ideal display carton.

Another object of my invention is the provision of a reel case of the type above described which will receive therein reels of varying makes and slightly different characteristics but of the same general diameter.

The above and still further objects of my invention will become apparent from the following detailed specification, appended claims, and attached drawings.

Referring to the drawings, wherein like characters indicate like parts throughout the several views:

Fig. 1 is a perspective view of a conventional casting reel attached to the reel seat of a fishing rod and illustrating the manner of insertion of my novel case unto the reel;

Fig. 2 is a view of my novel reel case, partly in side elevation and partly in section, taken substantially on the line 2—2 of Fig. 1, but showing my novel reel case totally enclosing the casting reel;

Fig. 3 is a cross sectional view, taken on the line 3—3 of Fig. 2;

Fig. 4 is a view in cross section, taken on the line 4—4 of Fig. 2;

Fig. 5 is an axial section taken on the line 5—5 of Fig. 4; and

Fig. 6 is a detail in section, taken on the line 6—6 of Fig. 5.

Referring with greater particularity to the drawings, the numeral 1 indicates, in its entirety, a fishing rod, the front portion of which is not shown but which is provided with a handle 2 and a conventional reel seat 3. A reel 4 is provided with the conventional mounting base or flange 5 which engages the seat 3 and is clamped thereto by suitable means such as a clamping screw 6. As shown, particularly by reference to Fig. 3, the mounting flange 5 is secured to the intermediate portion of a pair of tie rods 7 which extend transversely of the end plates 8 and 9 respectively, of the reel 4. The mounting flange 5 projects substantially tangential to the bottom of the reel 4 and is substantially narrower than the axial length thereof. A winding crank or handle 10 for rotating the winding drum or spool of the reel, not shown, through gear mechanism, also not shown, is secured to the end plate 8 of the reel 4 through a nut-equipped shaft 11 which is offset from the center of the end plate 8 so that the crank projects radially from one side of said plate.

My novel case comprises a pair of tubular sections 12 and 13, each of which has a closed end and each of which is adapted to axially receive in its open end the opposite end portions of the generally cylindrical reel 4. Thereafter, section 12 is adapted to be received telescopically within section 13. As will be observed, each of the sections is generally circular in cross section. However, section 13 is radially outwardly bulged to receive thereinto the radially-projecting crank handle 10 of the reel 4.

As shown, particularly by reference to Figs. 2 and 3, the tubular wall of the section 12 is provided with an outwardly-opening notch 14 for receiving the reel mounting base or flange 5 so that said flange projects generally tangentially out from opposite sides of the case and leaves the bottom portion of the flange free. It will be noted that the notch 14 terminates in spaced relation to the closed end of said tubular section 12. This feature is important in that it enables the sections 12 and 13 to be inserted unto the reel 4 irrespective of whether the same is attached to or detached from the rod 1. Preferably and as shown, the side edges 14' of the notch 14 diverge in the direction of the open end of the section 12. Adapted to be received within the notch 14 is an axially-extended tongue 15, preferably formed integrally with the side wall of the section 13 and projecting generally radially inwardly therefrom. The side edges 16 of the tongue 15 converge in the direction of the open end of the section 13 at an angle corresponding substantially to the angle of divergence of the side edges 14' of the notch 14, whereby to engage said side edges 14' with a wedging action to both retain the notched section against collapsing action and to hold the same against accidental separation from the section 13.

Preferably and as shown, the closed end of the section 13 is provided with a generally radially axially-extended elongated pocket 17, which pocket 17 is somewhat offset with respect to the axial center of the casing 13 and is of a width to loosely receive the handle 10.

It should be obvious that my novel casing can be made from any suitable rigid material while it is preferably formed from a transparent relatively non-breakable plastic material such as synthetic resin.

While I have described a preferred embodiment of my invention as provided by Section 4888 of the United States Statutes, it should be obvious that my invention is capable of considerable modification, without departure from the scope and spirit of the appended claims.

What I claim is:

1. A case for fish line reels having a mounting base for use in attachment to a rod and a radially-projecting crank, said case comprising a pair of tubular sections each closed at one end and adapted to be telescoped one upon the other, one of said sections having an outwardly-opening notch in its side wall for receiving said reel-mounting base, said notch terminating in spaced relation to the closed end of said case section, the other of said tubular sections having an elongated wedge-shaped tongue adapted to be frictionally received in the outwardly-opening notch of the first-mentioned section under telescoping movements of the two sections, said slotted case section being substantially circular in cross section, and said tongue-carrying case section being provided with a radially outwardly-bulged portion to receive therein said radially-projecting crank.

2. The structure defined in claim 1 in which said tongue-carrying case section is provided with a generally radially-extended elongated pocket which is offset with respect to the axial center of said case section.

3. The structure defined in claim 1 in which the side edges of said notch are generally parallel to the side edges of said tongue.

CHARLES C. REYNOLDS.

REFERENCES CITED

The following references are of record in the file of this patent:

UNITED STATES PATENTS

| Number | Name | Date |
|---|---|---|
| 1,669,353 | Sorbello | May 8, 1928 |
| 2,201,305 | Springer | May 21, 1940 |